Patented Feb. 13, 1951

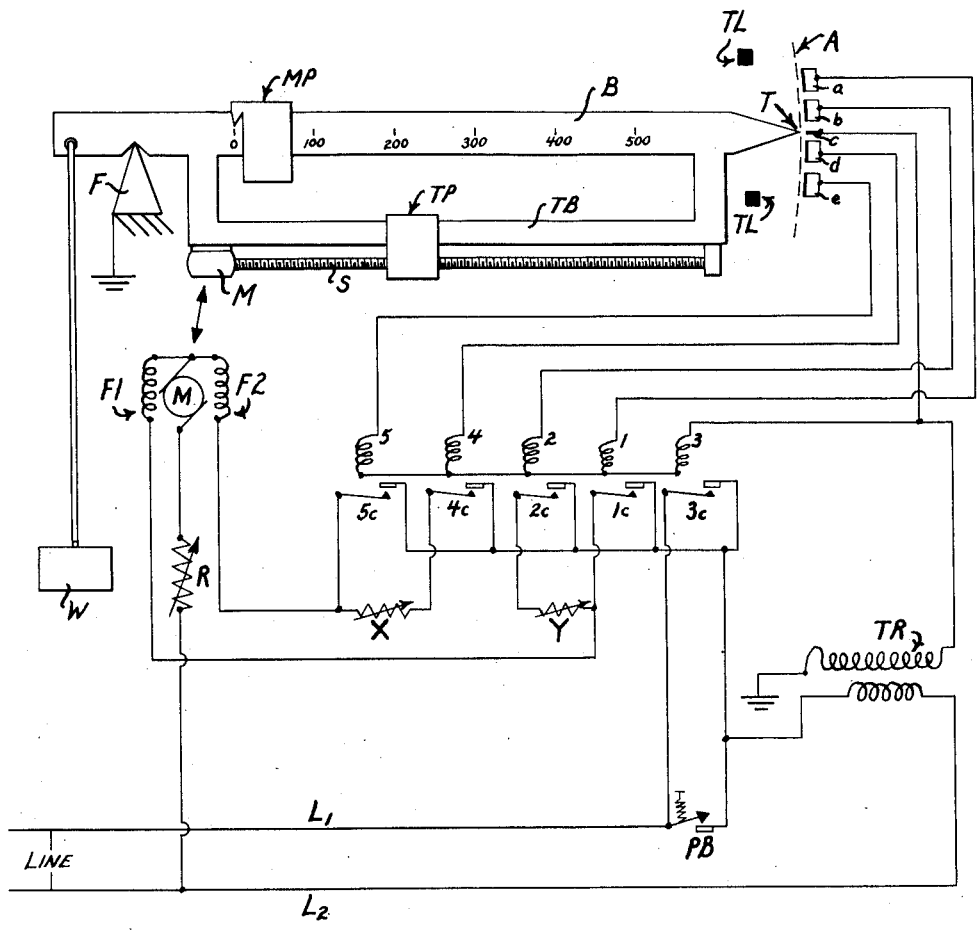

2,541,915

UNITED STATES PATENT OFFICE 2,541,915

AUTOMATIC POISE OPERATING MEANS FOR WEIGHING SCALES

Laurence R. Culver, Melbourne, Fla., assignor to Fairbanks, Morse & Co., Chicago, Ill., a corporation of Illinois Application June 14, 1947, Serial No. 754,616

4 Claims. (Cl. 265—56)

My invention relates to weighing scales, and has particular reference to an improved electrical system for moving and controlling the movement of a poise on a weigh beam whereby to effect, automatically, the balancing of a load placed on the scale platform.

The principal object and purpose of my invention is to provide an electrical system of this character which will cause the poise to move rapidly along the scale beam and without "overshooting" or hunting, and come to rest at a position wherein it precisely balances the load.

A further object resides in provision of a beam poise automatically movable by a motor in response to an unbalanced condition of a weigh beam, the control for which in no way interferes with the normal function and operation of the beam.

The foregoing objects are achieved in my improved poise control system by a commutation of circuits which control the operation of an electric drive motor for the beam poise, and which involves the passage of control currents across a gap between the moving beam and certain fixed electrodes. An important object of the invention resides in the provision of means that result in quick deenergization of the drive motor at or shortly before the desired condition of beam balance is reached.

These and other objects and advantages will appear from the following description and accompanying drawing which illustrates, diagrammatically, my improved system.

In the drawing, B is the main or weighing beam on which rides the main poise MP; TB is the tare beam with motor-operated poise TP which is moved to the right or left by a reversing motor M that drives the poise by means of the lead screw S. The fulcrum of the beam is F, the tare load W, and the beam-tip T which is shown in the balanced position.

The beam-tip T moves along the arc A between the limits set by the trig loop stops TL. Associated with this arc but outside of it by a few thousandths of an inch is a row of electrodes $a$, $b$, $c$, $d$, $e$, insulated from each other and from ground. These electrodes are more or less long, tangentially, except the centrally located $c$ which may be merely a wire tip. The spacing between electrodes is kept as short as possible consistent with satisfactory insulation.

Under conditions to be given, low-intensity sparks are allowed to pass between any one of the electrodes and the beam-tip, or an electrode mounted on the beam-tip, thus setting up operating current in the coil of a corresponding relay $1$, $2$, $3$, $4$ or $5$ whose contacts, respectively $1c$, $2c$, $3c$, $4c$, or $5c$, then are closed and perform some predetermined operation to be described.

The moderately high voltage from which the sparks originate is supplied by the high-leakage transformer TR, the secondary circuit of which, at certain times, is completed through relay coil 3 then through one of the other relay coils, through the spark from electrode to beam-tip, and thence back to the transformer secondary via the frame or structural parts of the scale to which the secondary is grounded as shown.

The motor M may be mounted on the tare beam TB and operated by means of flexible wire connections not shown, mechanically. The electrical arrangement, however, is shown as part of the wiring diagram wherein F1 is one series field adapted to turn the motor in such sense as to move the tare poise TP to the right, thus tending to lower the beam-tip. F2 is the other series field adapted to impart the opposite motion to the tare poise, thus tending to raise the beam-tip.

Speeds of operation of the motor are controlled by resistor R being set so as to control the maximum speed in either direction, and resistors X and Y similarly set to control a low speed of operation in either sense. The whole system is energized from the alternating current line after a momentary contact push-button PB is depressed by the operator.

The operational sequence is as follows:

Let it be supposed that initially the scale is balanced at zero load and that thereafter some tare weight W is placed upon the pan or platform of the scale. At once the beam-tip rises to an out-of-balance, up position. The operator then depresses the push-button PB momentarily, causing the primary winding of transformer TR to become energized, at first through a circuit controlled directly by push-button switch PB, and following release of the push-button, through the contacts $3c$ of a holding relay whose coil 3 becomes energized through a circuit supplied from the transformer secondary winding, as hereinafter explained.

With the beam tip disposed in its uppermost position a spark passes from electrode $a$ to the beam-tip T which is now located opposite to it. This spark completes a circuit which includes serially, the transformer secondary winding, coil 3 (of the holding relay), relay coil 1, the spark across the gap between electrode $a$ and beam-tip T, and through the scale frame ground back to the transformer secondary. Energization of relay coils 1 and 3 closes their respective contacts 1c and 3c completing the armature and field winding F1, of motor M. The operation of the motor through its coil F1, is in such direction to cause the tare poise TB to move outwardly along the tare beam a distance sufficient to cause the tare beam to drop. The beam tip passes in front of the electrode b, whereupon the spark transfers to that electrode without extinction. During the transition of the spark at the beam tip from electrode a to electrode b the holding relay coil 3 remains energized, but coil 2 replaces coil 1 in the relay circuit previously defined. Accordingly "high speed" relay contacts 1c open and "low speed" contacts 2c close, to redirect the motor current through resistance Y, thereby to reduce the motor speed, and cause the tare poise to advance very slowly to prevent overshooting the balance position. Eventually the beam tip passes electrode b, and starts across the gap between b and c whereupon the spark transfers to c. Interruption of the spark current at electrode b deenergizes the coils of both relay coils 2 and 3 which are in series circuit relation with that electrode, and hence relay contacts 2c and 3c open simultaneously to break the motor circuit and cause the tare weight to come to a dead stop at the balance point. Opening of contacts 3c intercepts the transformer primary circuit and deenergizes the entire control system with all motor control relays open. The poise drive motor will not again become active until two conditions are satisfied, viz., an unbalanced weigh beam and depression of the start push button PB. Depression of this push button when the scale is in balance causes a spark to pass from the central electrode c to the beam tip, without causing operation of motor M.

If the tare load that was initially placed on the scale were not sufficient to move the beam-tip all the way up to a point opposite electrode a, but instead moved it only to electrode b, only the slow speed half of the described sequence would have taken place but otherwise there would be no difference. If instead of adding load, it were removed, the sequence of events would be identical to that described but in the opposite direction. That is, the beam would initially be in a limiting position down, instead of up, and the high-speed operation would take place through operation of relay 5, followed by low-speed operation through relay 4, followed by final balancing action as described.

The provision of the central electrode c is highly advantageous in a system of the present character which involves the transmission of current in the form of an arc across an appreciable air gap between the fixed and movable electrodes. It will appear that the central electrode c is connected directly to the high potential source or transformer TR, whereas the electrodes a, b, d, and e are connected to said source each through a relay coil, so that central electrode c is impressed with higher potential than that of any one of the other fixed electrodes at the time of its arcing. Consequently, as the beam electrode T closely approaches the beam-in-balance position (shown in the drawing) the arc is attracted, so to speak, to the electrode c. The conductor leading from electrode c provides a circuit for the control current which by-passes the relay coils and their associated electrodes a, b, d and e, and when the arc between electrodes T and c strikes, any arc from electrodes b, or d quickly becomes extinguished, to effect a quick deenergization of the relays and the poise motor. In the absence of the central electrode c and its associated by-pass circuit the arc from either "slow-speed" electrodes b or d would be drawn out, and motor operation would be unduly prolonged, resulting in the poise overshooting the balance point and "hunting."

It is obvious that this system may be equally well applied to a main beam for automatic weighing; or to the indicator of a dial-scale instead of the beam of a beam-scale for automatic taring or weighing. Evidently also a different kind of reversing motor might be used, etc., without change in principle.

I claim:

1. In a weighing scale including a pivoted beam, a poise thereon, a motor operatively connected to said poise for moving the same along the beam, an electrical system for controlling the operation of said poise motor, including a motor energizing circuit, a relay for controlling the energization of said circuit, a control circuit for said relay, including therein a sparking terminal on said scale beam and movable therewith, a fixed sparking terminal extending along and spaced from the path of movement of said beam terminal, a source of control current of potential sufficient to arc across the space between said terminals to energize said relay, a third sparking terminal insulated from the second said terminal and fixed in spaced opposition to the position occupied by said beam terminal when the beam is in balance, and a conductor connecting said third terminal to said current source, so as to by-pass the control current around said relay and the second said terminal when the beam is in balance.

2. In a weighing scale including a pivoted beam, a poise thereon, a motor operatively connected to said poise for moving the same along the beam, electrical control means for said motor comprising a relay, a high tension energizing circuit for said relay including a terminal carried by and movable with the beam, a fixed, second terminal separated from the path of movement of said beam terminal by a spark gap, said second terminal being off-set along said path from the normal, beam-in-balance position of said beam terminal, and a third, fixed terminal opposing the beam-in-balance position of the beam terminal, said third terminal being connected to said current source to pass current therefrom to the beam terminal, in by-passing relation to the relay and said second terminal, when the beam is in balanced position.

3. In a weighing scale including a pivoted beam, a poise thereon, a reversible motor operatively connected to the poise to move the same along the beam, control means for said motor and electrical circuits therefor, including a relay for controlling operation of the motor in one direction, a relay for controlling operation of the motor in the opposite direction, and a source of relatively high potential current for energizing said relays, switching means included in said electrical circuits for effecting the selective energization of said relays, comprising a switch terminal mounted on the scale beam for movement therewith and a plurality of fixed switch terminals each electrically connected to one of said relays, positioned along the path of movement of said movable terminal and on opposite sides of the beam-in-balance position of said movable terminal, each of said fixed terminals being spaced from the path of movement of said movable terminal by a spark gap such as to assist spark transmission of current to the beam terminal when the latter is disposed in confronting relation to the fixed terminals, and an additional fixed terminal disposed in direct opposition to the beam-in-balance position of said movable terminal and spaced from the latter, said additional terminal being connected to said current source for spark-transmission of current therefrom to said beam terminal in by-passing relation to said relays and the other fixed terminals when the beam is in balance.

4. In a weighing scale including a pivoted beam, a poise thereon, a reversible, variable speed motor operatively connected to the poise for moving the same along said beam, control means for said motor and electrical circuits connecting said control means as follows: an electrode having small end dimensions mounted on said beam and movable therewith into and out of a beam-in-balance position, a series of fixed, relatively insulated electrodes arranged along the path of movement of said beam electrode and spaced therefrom, said series including a central electrode having relatively small end dimensions, disposed in direct opposition to the beam-in-balance position of said beam electrode, and a pair of electrodes of substantially greater end extent, disposed at each side of said central electrode; electrical means operatively interconnecting each of said paired electrodes to said motor, means for supplying current at relatively high potential to said electrodes, whereby to cause spark-transmitted motor control current to pass between said beam electrode and the one of said fixed electrodes which is nearest thereto, the fixed electrodes on opposite sides of and adjacent the central electrode being connected so as to pass spark-transmitted control current to effect slow speed rotation of the motor in relatively opposite directions, the fixed electrodes remote from said central electrode being connected to effect high speed rotation of the motor in relatively opposite directions, and said central electrode being connected and adapted to coact with said beam electrode when the latter is in beam-in-balance position, to complete a by-pass circuit between said current source and said beam electrode whereby to effect deenergization of said motor.

LAURENCE R. CULVER.

REFERENCES CITED

The following references are of record in the file of this patent:

UNITED STATES PATENTS

| Number | Name | Date |
|---|---|---|
| 618,384 | Richards | Jan. 24, 1899 |
| 1,484,358 | Norton | Feb. 19, 1924 |
| 1,952,171 | Jones | Mar. 27, 1934 |
| 2,068,565 | Okey | Jan. 19, 1937 |
| 2,315,176 | Zacharia | Mar. 30, 1943 |
| 2,331,698 | Keeler | Oct. 12, 1943 |
| 2,389,446 | McCormack | Nov. 20, 1945 |
| 2,399,023 | Harkness | Apr. 23, 1946 |

FOREIGN PATENTS

| Number | Country | Date |
|---|---|---|
| 774,476 | France | Dec. 7, 1934 |